US008862495B2

(12) United States Patent
Ritter

(10) Patent No.: US 8,862,495 B2

(45) Date of Patent: Oct. 14, 2014

(54) METHOD FOR RECYCLING PRODUCTS

(75) Inventor: Rudolf Ritter, Zollikofen (CH)

(73) Assignee: Swisscom AG (CH)

( * ) Notice: Subject to any disclaimer, the term of this patent is extended or adjusted under 35 U.S.C. 154(b) by 1523 days.

(21) Appl. No.: 11/236,357

(22) Filed: Sep. 27, 2005

(65) Prior Publication Data

US 2006/0069588 A1 Mar. 30, 2006

(30) Foreign Application Priority Data

Sep. 28, 2004 (EP) .................................... 04104733

(51) Int. Cl.

| | |
|---|---|
| ***G06Q 30/00*** | (2012.01) |
| ***G07F 7/06*** | (2006.01) |
| ***G06Q 10/00*** | (2012.01) |
| ***G06Q 20/32*** | (2012.01) |
| ***G06Q 20/10*** | (2012.01) |

(52) U.S. Cl.

CPC .......... *G06Q 20/3227* (2013.01); *G07F 7/0609* (2013.01); *G06Q 10/30* (2013.01); *G06Q 20/10* (2013.01)

USPC .......................................... 705/14.1; 194/209

(58) Field of Classification Search

USPC ............................ 705/14, 1, 67, 65; 194/209

See application file for complete search history.

(56) References Cited

U.S. PATENT DOCUMENTS

| | | | | |
|---|---|---|---|---|
| 4,248,334 | A * | 2/1981 | Hanley et al. | 194/209 |
| 4,579,216 | A * | 4/1986 | DeWoolfson et al. | 194/212 |
| 4,717,026 | A | 1/1988 | Fischer et al. | |
| 5,111,927 | A * | 5/1992 | Schulze, Jr. | 194/209 |
| 5,340,948 | A * | 8/1994 | Ramsden | 177/25.15 |
| 5,647,256 | A * | 7/1997 | Schneider | 83/140 |
| 5,673,333 | A * | 9/1997 | Johnston | 382/137 |
| 5,887,266 | A * | 3/1999 | Heinonen et al. | 455/558 |
| 5,947,256 | A * | 9/1999 | Patterson | 194/209 |
| 6,000,555 | A * | 12/1999 | Anma | 209/534 |
| 6,477,514 | B1 * | 11/2002 | Gil et al. | 705/410 |

(Continued)

FOREIGN PATENT DOCUMENTS

| | | |
|---|---|---|
| DE | 199 10 005 A1 | 9/2000 |
| WO | WO 02/39357 A1 | 5/2002 |
| WO | WO 02/080121 A2 | 10/2002 |

OTHER PUBLICATIONS

"RFIDTalk Forums," www.rfidtalk.com, Published Apr. 2004, pp. 1-3 of 3.*

(Continued)

*Primary Examiner* — Brian Epstein

(74) *Attorney, Agent, or Firm* — McAndrews, Held & Malloy, Ltd.

(57) ABSTRACT

A method and data carrier programmed with instructions for the method for recycling products includes recording through a mobile device that a product to be recycled has been brought to a collection point. The mobile device includes an identification module for identifying the mobile device and/or a user. A deposit is credited by the recycling of the product or a recycling fee is debited by the recycling of the product on an account linked with the identification module. Another aspect includes recording that a product to be recycled has been brought to a collection point. A code identifying the product is recorded by the collection point, and a first signal is sent to a mobile device that the product is to be recycled. A reward or debiting linked with the recycling of the product is automatically determined and credited or billed on an account linked with the identification module.

14 Claims, 1 Drawing Sheet

(56) References Cited

U.S. PATENT DOCUMENTS

| | | | | |
|---|---|---|---|---|
| 6,626,357 | B1 * | 9/2003 | Ross | 235/379 |
| 6,796,490 | B1 * | 9/2004 | Drummond et al. | 235/379 |
| 6,796,499 | B1 * | 9/2004 | Wang | 235/384 |
| 7,005,988 | B2 * | 2/2006 | Mathewson et al. | 340/572.4 |
| 7,006,983 | B1 * | 2/2006 | Packes et al. | 705/14.34 |
| 7,215,249 | B2 * | 5/2007 | Carrender et al. | 340/572.1 |
| 7,316,351 | B2 * | 1/2008 | Carlson | 235/380 |
| 2001/0051922 | A1 * | 12/2001 | Waller et al. | 705/43 |
| 2002/0059298 | A1 * | 5/2002 | Kamata | 707/104.1 |
| 2002/0152179 | A1 * | 10/2002 | Racov | 705/67 |
| 2003/0010821 | A1 * | 1/2003 | Silberberg | 235/382 |
| 2003/0078895 | A1 * | 4/2003 | MacKay | 705/64 |
| 2003/0116622 | A1 * | 6/2003 | Suttie et al. | 235/379 |
| 2003/0183683 | A1 * | 10/2003 | Stewart | 235/376 |
| 2004/0019564 | A1 * | 1/2004 | Goldthwaite et al. | 705/44 |
| 2004/0039632 | A1 * | 2/2004 | Han et al. | 705/13 |
| 2004/0098355 | A1 * | 5/2004 | Biasi et al. | 705/404 |
| 2004/0148189 | A1 * | 7/2004 | Stoffelsma | 705/1 |
| 2004/0199474 | A1 * | 10/2004 | Ritter | 705/65 |
| 2004/0267642 | A1 * | 12/2004 | Stenz et al. | 705/28 |
| 2005/0086140 | A1 * | 4/2005 | Ireland et al. | 705/35 |

OTHER PUBLICATIONS

"The EPCglobal Network: Overview of Design, Benefits, and Security," The EPCglobal Network, Published 2004, p. 4 of 13.*

Hilliard and Sweeney II, "Electronic Product Codes," Odin technologies, Published Sep. 15, 2003, pp. 4-5 of 9.*

* cited by examiner

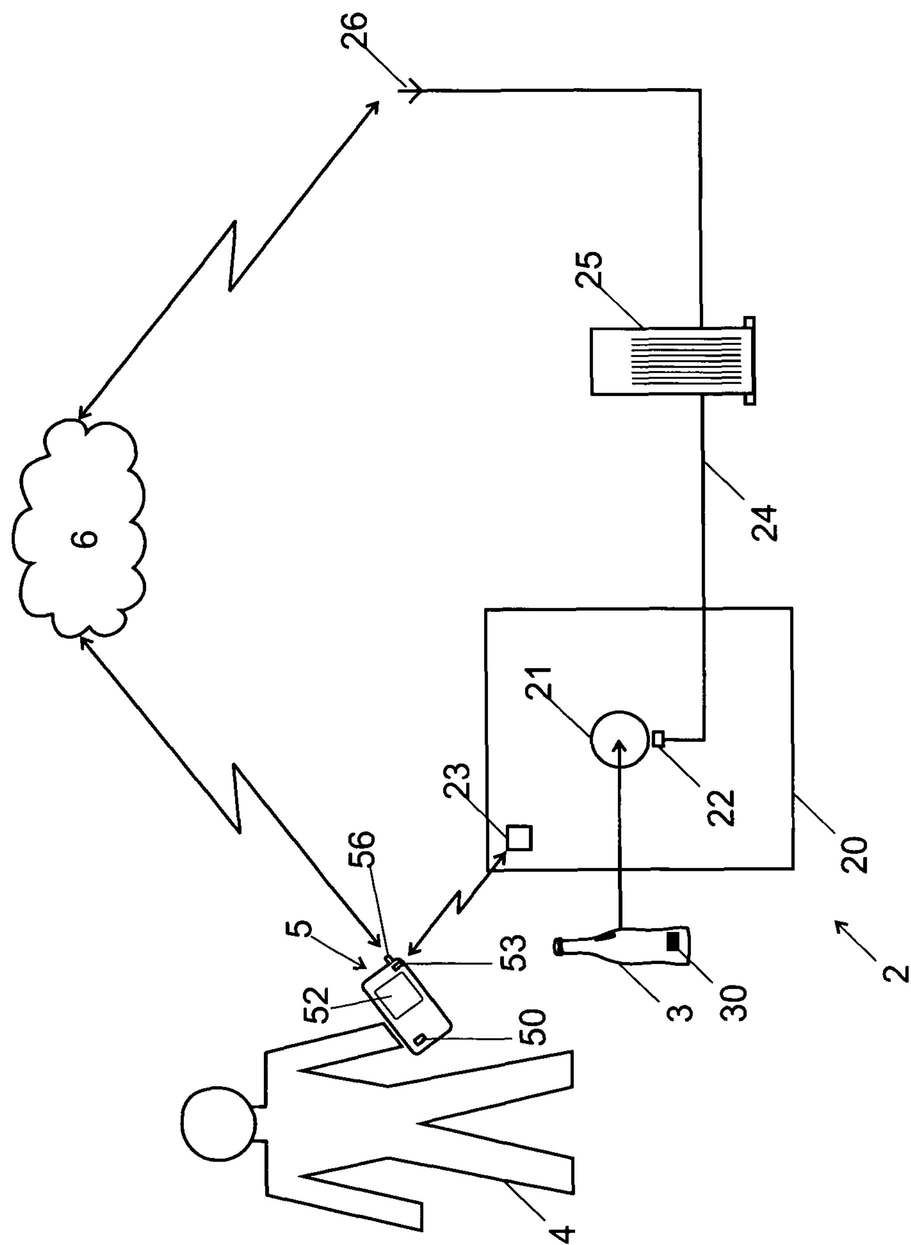
26
25
6
24
21
23
22
20
56
5
53
52
50
3
30
2
4

METHOD FOR RECYCLING PRODUCTS

REFERENCE DATA

This application claims priority of European patent application 2004EP-104733, filed on Sep. 28, 2004, the contents of which are hereby incorporated by reference.

FIELD OF THE INVENTION

The present invention concerns a method for recycling products. The present invention concerns in particular a method for recycling products, wherein a money amount caused by the recycling is automatically credited to or debited from a money account.

RELATED ART

For recycling several products such as for example glass or PET bottles, users who hand in such a product for example to a collection point provided for this, are rewarded with the refund of a deposit, which is usually a small amount of money. The deposit mainly serves to encourage the users to bring back the bottles or other products to certain collection points and not to simply throw them away in a common refuse bin. For other products that for example cannot be disposed of simply and/or that contain substances that are critical for the environment, which makes their recycling expensive, the recycling costs are partly or fully billed to the user who hands in such a product.

Collection points for glass or PET bottles in shops are known in the prior art, where a receipt is automatically issued when corresponding bottles are handed in. The user must then go to the till with the receipt in order to receive the deposit cash or credited on a bill for further purchases. A disadvantage of such collection points is that the user only gets the deposit back if the shop is open. Such a method is furthermore cumbersome and expensive for the shop.

For billing the money amounts caused by the recycling of certain products, the latter are billed for example when the corresponding product is bought. They must however be forwarded by the shop for example to the recycling institution, which is often a time-consuming operation where errors can also occur.

The money amounts caused by the recycling are furthermore usually relatively small. The administration of such money transactions, which in the state of the art are often at least partially manual, is thus relatively expensive in relation to the money amounts themselves.

BRIEF SUMMARY OF THE INVENTION

It is an aim of the invention to propose a method for recycling products that does not have the disadvantages of the prior art methods.

A further aim of the invention is to propose a method for easily crediting and/or billing amounts to a user for the recycling of products.

These aims are achieved through methods for recycling products that have the characteristics of the independent claims. Advantageous embodiments are furthermore indicated in the dependent claims.

These aims are achieved in particular through a method for recycling products comprising the following steps:

- recording through a mobile device that a product to be recycled has been brought to a collection point, wherein the mobile device comprises an identification module for identifying the mobile device and/or a user,
- crediting a deposit caused by the recycling of the product or debiting a recycling fee caused by the recycling of said product on an account linked with said identification module.

These aims are achieved in particular with a data carrier with a program for executing this method.

These aims are achieved in particular through a method for recycling products comprising the following steps:

- recording through a collection point that a product to be recycled has been brought to the collection point,
- sending a first signal to a mobile device that the product is to be recycled.

With the inventive method and data carrier, a reward or billing caused by the recycling of the product is automatically determined and credited or debited on an account linked with the identification module.

BRIEF DESCRIPTION OF THE DRAWINGS

The invention will be better understood with the description of a preferred embodiment and with the aid of the drawing, in which:

FIG. 1 shows a diagrammatic representation of the method of the invention according to one embodiment.

DETAILED DESCRIPTION OF THE INVENTION

In one embodiment of the invention, represented diagrammatically in FIG. 1, the product 3 to be recycled is marked for example with a RFID tag 30 that preferably contains a code respectively an identification code. In the represented example, the product to be recycled is an empty bottle. In the frame of the invention, the product can also be a piece of clothing, an electronic apparatus, metallic objects, etc.

Within the frame of the invention, the product to be recycled can also be the code itself. In such an embodiment, the product to be recycled is thus a code such as for example an identification code that is stored for example in a RFID tag for identifying a particular object. In one embodiment, the code is recycled for example in that the code carrier such as the RFID tag is separated from the identified product, possibly collected and made available for use on a new product. In another embodiment, the code is read from the code carrier and re-used independently from the code carrier, in that it is sent electronically to a server for example and is collected for example in a database of newly available codes. The code carrier is then preferably destroyed, deleted or marked as invalid, while the code is used for example at a later point in time for identifying a new product. The product to be recycled can be a single code and/or a group of for example consecutively running codes.

RFID tags consist mainly of an integrated circuit (not represented) and of an antenna (not represented) that is connected electrically with the integrated circuit. The integrated circuit comprises a memory area, for example a ROM (Read-Only Memory) or an EEPROM (Electrically Erasable programmable ROM), in which data can be stored. The data stored in the RFID tag preferably serve for identifying the marked product. They include for example a code that preferably indicates the type of the product. The code can also contain further information such as for example the name of the producer of the product, the production date, the production place etc. as well as possibly a serial number.

The data stored in RFID tags are usually read contactlessly with the aid of RFID readers. Data can possibly also be written in RFID tags, for example to indicate the final sale of the corresponding product or its re-use. The data stored in RFID tags can also be deleted partially or completely for example when recycling or destroying the identified product, so that the RFID tags can be used for identifying new products and are thus themselves recycled. The data stored in the memory area of the RFID tag are transmitted to the reader over the tag's antenna. RFID tags are mostly passive elements that use the reader's energy for sending the data.

If a product 3 marked with a RFID tag 30 is recycled, the data stored in the RFID tag 30 are preferably read automatically. The product 3 is brought for example by a user 4 to a collection point 2 where one or several containers 20 are available for collecting one or several types of products to be recycled. When the product 3 is put by the user 4 in the corresponding container 20, the RFID tag 30 is read for example by a RFID reader 22 preferably integrated in the container 20. In another embodiment, the RFID tag 30 is read manually by a serving attendant or by the user 4 himself.

The read data are used for identifying the handed in product 3 to be recycled and/or to check whether a deposit or a fee is caused by its recycling. The read data include for example a code that indicates the product type, the product manufacturer, the production date etc. The code is for example an EPC code. With this EPC code it is thus preferably possible to access PML pages in one or several databases that are connected with the EPC code and that contain information about the product 3.

Identifying the product to be recycled and/or determining whether a deposit or a fee is caused by its recycling is carried out for example in a computer 25 that is connected with the RFID reader 22 for example over a data interface 24. The computer 25 preferably has access to a database, not represented, that indicates the connection between certain identification codes and for example the type of the corresponding product. This database can be a table, a PML page etc. that is available in the computer 25 itself or in another external server. The data read in the RFID tag 30 are forwarded by the RFID reader 22 to the computer 25 so that the latter can determined the type of the product 3 to be recycled and/or determine whether a deposit or a fee is caused by the recycling of the product 3.

In one embodiment of the invention, a money amount for the deposit or for the fee that is credited or billed to the user 4 who has brought the product 3 to the collection point 2 is also determined from a further or from the same database for example by the computer 25.

The user 4 preferably carries a mobile device 5, for example a mobile telephone, a PDA etc. that preferably has a contactless or wireless interface at close range 53. The contactless interface at close range 53 is for example an infrared, a Bluetooth or a WLAN interface that has a range of up to several meters and allows a contactless or wireless communication with a further corresponding interface 23 in this range.

The mobile device 5 preferably also includes a mobile radio interface 56 for communication in a mobile radio network 6. The mobile radio interface 56 is for example a GSM interface for communication in a GMS network, a UMTS interface, a WLAN interface etc. The mobile device 5 preferably further includes an identification module 50 for identifying the user 4 and/or the mobile device 5. The identification module 50 is for example a chip-card that can be removed from the mobile device 5 and that allows the user 4 and/or the mobile device 5 to be identified in the mobile radio network 6. In the case of a GSM mobile telephone, the chip-card is for example a SIM card that allows the user 54 to be identified through a MSISDN and/OR IMSI number stored in the SIM card.

In a simple variant embodiment, the mobile device 5 is merely a plastic card, e.g. in credit card format, with a RFID tag and a RFID interface 53. The RFID card serves as data carrier between the container 20 and a reading mobile, not represented, that is connected with a mobile radio network 6. Thus the collected credits and/or the code to be recycled are written by the container 20 onto the RFID card 5 and transmitted at a later point in time from the RFID card 5 to the server 25 over the mobile radio network 6.

Preferably, a communication is established between the mobile device 5 and the collection point 2, for example with the container 20. A communication is for example established automatically or manually when the user 4 with the mobile device 5 is located in the vicinity of the collection point 2.

According to one embodiment of the invention, the communication between the mobile device 5 and the collection point 2 is a communication at close range that is built over the contactless interface at close range 53 of the mobile device 5 and a similar contactless or wireless interface at close range 23 in the collection point 2—for example in the container 20. In a variant embodiment, the collection point 2 recognizes for example that a mobile device 5 with a contactless interface at close range 53 is located in its vicinity. The establishment of a communication is then automatically initiated by the collection point 2. In another variant embodiment, the establishment of the communication is initiated by the user 4, by sending for example a corresponding signal with his mobile device 5 to the collection point 2.

According to another embodiment of the invention, the communication between the mobile device 5 and the collection point 2 is built over the mobile radio network 6, the collection point 2 being preferably provided with a mobile radio interface 26 for communication in the mobile radio network 6. In a variant embodiment, the communication is carried out with messages such as for example SMS, USSD, MMS messages or e-mails. In another variant embodiment, a telephone and/or data communication is built for example through the WEB or the WAP between the mobile device 5 and the collection point 2.

After the product 3 to be recycled has been identified by the computer 25 with the aid of the data stored in the RFID tag 30 and/or after it has been determined that its recycling is linked to deposits or fees, for example after it has been put in the container 20, a first signal is sent by the collection point 2 to the mobile device 5. According to one embodiment of the invention, the first signal is sent over the contactless interface at close range 23. According to another embodiment of the invention, the first signal is sent over the mobile radio interface 26 for example in the form of a SMS, USSD, MMS message or e-mail. The first signal possibly includes information about the type of the product 3 to be recycled and/or about a money amount caused by the recycling of the product 3. In one embodiment of the invention, the first signal is for example only a signal impulse that is interpreted in the rece3iving mobile device 5 as signal that a product 3 of a particular type is to be recycled.

The first signal is preferably signed, encrypted and/or provided with a time stamp in order to prevent it from being falsified and in order preferably to allow the sending collection point 2 to be identified.

The first signal is received in the mobile device 5 and interpreted for example by a program running in the mobile device 5. By this interpretation of the first signal, the mobile device 5 records that a product 3 is to be recycled. The program then preferably shows certain information about the product 3 to be recycled on the display 52 of the mobile device 5 so that the user 4 can for example check that the product 3 he has handed in has been correctly recognized. The information displayed includes for example the type of product 3, the value of the deposit or of the recycling fee, etc.

In the first signal, other messages are in one embodiment also sent to the mobile device 5 besides the information linked with the product 3. These messages include for example a thank you for recycling the pro-duct 3, targeted advertising, guidelines, route map to the location of the next collection point, etc. These messages are then interpreted preferably by the program in the mobile device 5 and possibly displayed on the display 52 and/or acoustically. In one embodiment of the invention, these messages are prepared in the mobile device 5 for example by the program.

In one embodiment of the invention, the user 4 is asked for example by the program in the mobile device 5 to confirm the accuracy of the displayed information linked with the product 3, in particular the accuracy of the product type. The confirmation occurs for example by pressing on a key of the mobile device 5, by selecting an option in a program menu etc. The confirmation is then preferably received and interpreted by the program running in the mobile device 5. The program then preferably prepares a confirmation signal that is sent by the mobile device 5 to the collection point 2 in order for example for the container 20 to accept the product 3. In one embodiment of the invention, the product 3 to be recycled is identified before being put in the container 20 and the container 20 then only opens if a confirmation signal that the product 3 has been correctly identified has been received by the collection point 2.

If the user 4 does not confirm the accuracy of the displayed information, for example by selecting a corresponding option in a program menu or by not reacting within a certain period of time, a negative signal is then preferably prepared by the program and sent by the mobile device 5 to the collection point 2. The product 3 is then for example returned to the user 4 or the container 20 is not opened. The user 4 can then attempt again to recycle the product 3 in the same or in another container 20 and/or collection point 2. If after a certain time the collection point 2 does not receive any signal from the mobile device 5, the recycling of the product 3 is preferably also stopped.

The information about the product 3 to be recycled, such as for example the type of product, the money amount caused by the recycling of the product 3, etc. of which at least a part is preferably shown on the display 52 of the mobile device 5, is in one embodiment of the invention comprised in the first signal. This information is then read by the program in the mobile device 5 and if necessary displayed. In a further embodiment of the invention, at least part of this information is retrieved from a database, not represented, such as for example from a table stored in the mobile device 5 and/or in a remote server, from a PML page, etc. In yet another embodiment, certain information is implicitly determined, because it is for example always the same for a certain product type. This is for example the case for the deposit for the recycling of certain products.

If the product 3 is accepted by the collection point 2, a deposit or a recycling fee for example is credited respectively debited to the user 4. The deposit or the recycling fee is preferably credited respectively debited on a money account linked with the identification module 50.

In one embodiment of the invention, the money account is an account external to the mobile device 5 and linked with the identification module 50. It is for example a debit account at a bank, a credit card account, a prepaid account, an account with an external finance institute, etc. A message is then preferably prepared by the program in the mobile device 5 or by the collection point 2 for example in the server 25, with the information that a product 3 to be recycled of a certain type was brought and/or handed in to a collection point 2. the message preferably contains an identification of the user 4 and/or of the identification module 50. In a variant embodiment, the message also contains the money amount caused by the recycling of the product 3. The message is preferably sent over the mobile radio interface 56 o 26 to the operator of the money account. In the case of a GSM network, the second message is for example a SMS, MMS or USSD message, an e-mail, etc. In a variant embodiment, the message consists of several messages, wherein the information necessary for crediting or billing the money amount are for example distributed in these different messages. In this embodiment, a message is for example prepared by the program in the mobile device 5 with identification data from the identification module 50, while a further message with the type of the product 3 and/or with the money amount caused by the recycling of the product 3 is prepared and sent by the collection point 2.

In one embodiment of the invention, the account is administered for example by the operator of the mobile radio network 6. The money amount is for example credited or billed on an invoice linked with the mobile user. The invoice is for example the telephone bill of the user 4 for using the mobile device 5 in the mobile radio network 6. The message with the information necessary for crediting or billing is then preferably sent directly to the operator of the mobile radio network 6.

In a further embodiment, the deposit or the recycling fee is credited respectively debited on a money account stored in the mobile device 5. The money account is then for example an e-cash account that is stored for example on the identification module 50. In this case, the information such as the type of the product 3 and the money amount caused by its recycling are preferably processed directly in the mobile device 5 for example by the program.

In yet another embodiment, no money amount is caused directly by the recycling of the product 3. On the contrary, through the recycling of the product 3, the user 4 is included in a customer loyalty program. When recycling each product 3, for example a voucher, for example an electronic voucher, is sent to the user 4 or is collected for the user 4 in a center (not represented). After a predetermined number of vouchers, the user 4 is for example rewarded with a new product 3 or with another prize.

In the above-mentioned embodiments, the product 3 is marked with a RFID tag 30. Within the frame of the invention, however, the product 3 can also be marked with a barcode or with another identification system. The reader 22 at the collection point 2 is in this case preferably adapted to the type of marking.

In one embodiment of the invention, the deposit 3 is identified with an EPC code. According to the EPC Global System, each single product 3 is identified with a unique code. Different information about the product is then preferably available on different servers through PML pages, wherein the EPC code serves as key to this information. The information available on the PML pages then include for example:

- the type of the product 3,
- the money amount linked with its recycling (deposit or recycling fee),
- a list of the collection points that accept products of this type,
- data about the customer loyalty program, information about collection operations in a certain period or at a certain location, the identity of the end buyer and/or of the owner of the product, etc.

This information or only part thereof is preferably available to the user 4, for example by him preparing a certain query with the EPC code of the product 3 and sending it for example to a certain server. Certain information from PML pages is also retrieved for example when recycling the product 3. This information includes for example the product type, the deposit or the recycling fee, data about the customer loyalty program, etc.

In one embodiment of the invention, the identity of the end buyer or of the owner of the product 3 is for example retrieved from a PML page when the product is brought to the collection point 2 and identified. The identity of the end buyer or of the user then preferably includes also data about the identification module of a mobile device, for example a mobile telephone number of the end buyer or of the owner. According to this embodiment, no communication is for example established between the mobile device 5 and the collection point 2. The deposit caused by the recycling of the product 3 or the fee caused by the recycling of the product 3 is credited respectively debited on an account that is linked with the data retrieved from the PML page over the identification module.

In one embodiment of the invention, no communication at close range is established between the collection point 2 and the mobile device 5. When the product 3 to be recycled is handed in, the user 4 for example sends with his mobile device 5 over the mobile radio interface 56 a first signal to an address or a telephone number indicated for example at the collection point 2. In a GSM network, this signal is for example a SMS, MMS or USSD message. With this signal, the mobile device 5 at the collection point 2 is identified, for example by determining a caller telephone number (CLI) in the computer 25. A second signal, that possibly contains the type of the product 3 and/or the money amount caused by the recycling of the product 3, is then sent to the mobile device 5 preferably also over the mobile radio network 6.

In yet another embodiment, the communication between the mobile device 5 and the collection point 2 is initiated manually, for example by actuating a keyboard at the collection point 2, on which the user 4 enters the telephone number of the mobile device 5 or is otherwise identified.

The method of the invention is preferably automatic and is preferably at least partially performed at a certain collection point 2. Within the frame of the invention, the method can also be partly performed manually. In one embodiment, the collection point 2 is for example operated manually. The first signal and/or the second signal are then for example prepared manually by an operator. The type of the collection point 2 and/or of the container 20 can in the frame of the invention be very different. It is in particular adapted to the type of the product 3 to be recycled.

The program running in the mobile device 5 for executing the method of the invention is preferably stored in the mobile device 5, for example in a memory area of the identification module 50. The program is preferably loaded in the mobile device 5 by downloading it for example as applet, as plug-in, as addressable files, etc. from an external data carrier such as for example from a hard disk in an external server.

What is claimed:

1. A method for recycling a product comprising:

recording, by a RFID reader of a collection point comprising at least one container that accepts material being deposited for recycling, an EPC code stored by a RFID tag individually marking the product to identify the product to be recycled and identify a deposit value associated with recycling of the product;

transmitting information to a mobile device possessed by a user to be recorded by the mobile device and indicate that the product to be recycled has been brought to the collection point, wherein the mobile device comprises an identification module for uniquely identifying said mobile device, a user of the mobile device, or both said mobile device and said user in a wide area communication network, the mobile device, the user or both the mobile device and the user identified by the identification module being affiliated with a financial account, wherein said transmitting information to the mobile device comprises transmitting one or more of an identity of the product, a deposit value to be credited and a recycling fee to be charged to be included in a message transmitted by the mobile device over the wide area communication network for requesting an amount corresponding to the deposit value caused by the recycling of said product to be credited to the financial account or a recycling fee caused by the recycling of said product to be debited from the financial account, said information transmitted to the mobile device further comprising a request that the user of the mobile device input a response to the mobile device indicating whether displayed information displayed to the user by the mobile device associated with recycling of the product is accurate;

receiving a positive or negative confirmation signal transmitted from the mobile terminal in response to the user inputting the response to the mobile terminal, the positive confirmation signal indicating that the displayed information associated with recycling the product is accurate, and the negative confirmation signal indicating that the displayed information associated with recycling the product is not accurate;

in response to receiving the positive confirmation signal indicating that the displayed information associated with the product is accurate, opening the container during recycling of the product to receive the product; and not opening the container to receive the product if the information associated with the product is not confirmed to be accurate by the user.

2. The method of claim 1, comprising:

transmitting a signal conveying certain information about the product to be recycled to the mobile device, said signal causing the mobile device to display the certain information about the product to be recycled on a display provided to the mobile device for confirmation by the user.

3. The method of claim 1, wherein the collection point is operatively connected to a database storing a connection between the EPC code, a product type, and associated deposit to be credited and/or fee to be charged for recycling of the product.

4. The method of claim 1, wherein the EPC code indicates at least one of:

a type of the product;

a manufacturer of the product; and a production date of the product.

5. The method of claim 1, wherein different information about the product is available to be retrieved with the EPC code from a plurality of different servers.

6. The method of claim 5, wherein the different information that can be retrieved from the plurality of different servers comprises one or more of:

a type of the product;

a monetary value associated with recycling the product;

a list including a plurality of collection points that accept the product to be recycled;

information about a customer loyalty program;

information about a collection operation occurring during a specific period of time;

information about a collection operation at a specific location; and an identity of an entity that is to receive the product from the collection point to recycle the product.

7. The method of claim 1, wherein said collection point transmits the information to be recorded by the mobile device via a first signal that is responsive to the recording by a RFID reader of a collection point of the EPC code.

8. The method of claim 7, wherein said first signal is received over a contactless interface at close range of said mobile device.

9. The method of claim 7, wherein said first signal is received over a mobile radio interface of said mobile device.

10. The method of claim 7, wherein said first signal is signed, encrypted, or both signed and encrypted.

11. The method of claim 7, comprising confirming recording of information by the mobile device by transmitting from the mobile device a second signal.

12. The method of claim 11, wherein said second signal is transmitted over a contactless interface at close range of said mobile device.

13. The method of claim 11, wherein said second signal is transmitted over a mobile radio interface of said mobile device.

14. The method of claim 11, comprising transmitting said second signal to the collection point.

* * * * *